United States Patent [19]
Tjahjadi et al.

[11] Patent Number: 5,551,777
[45] Date of Patent: Sep. 3, 1996

[54] SINGLE SCREW EXTRUDER CAPABLE OF GENERATING CHAOTIC MIXING

[75] Inventors: Mahari Tjahjadi, Clifton Park, N.Y.; Robert W. Foster, Evansville, Ind.

[73] Assignee: General Electric Company, Schenectady, N.Y.

[21] Appl. No.: 558,380

[22] Filed: Nov. 16, 1995

Related U.S. Application Data

[63] Continuation of Ser. No. 121,473, Sep. 16, 1993, abandoned.

[51] Int. Cl.⁶ ........................................................ B27F 3/02
[52] U.S. Cl. ............................. 366/100; 366/79; 366/80; 366/81
[58] Field of Search ............................ 366/100, 97, 98, 366/83, 84, 96, 298, 299, 300, 79–81, 89, 90, 208, 324; 425/208; 264/211.21

[56] References Cited

U.S. PATENT DOCUMENTS

| | | | |
|---|---|---|---|
| 1,626,675 | 5/1927 | Hanley, Jr. | 366/100 |
| 2,484,506 | 10/1949 | Hawk | 366/97 X |
| 3,593,843 | 7/1971 | Hill | 198/213 |
| 3,901,482 | 8/1975 | Kieffaber | 366/100 |
| 3,989,941 | 11/1976 | Gasior et al. | 259/191 |
| 4,092,015 | 5/1978 | Koch | 366/81 |
| 4,215,978 | 8/1980 | Takayama et al. | |
| 4,227,870 | 10/1980 | Kim | |
| 4,834,543 | 5/1989 | Nortey | 366/97 |
| 5,035,509 | 7/1991 | Kruder | 366/90 X |
| 5,071,256 | 12/1991 | Smith et al. | 366/89 |
| 5,332,309 | 7/1994 | Ramazzotti et al. | 366/90 X |

FOREIGN PATENT DOCUMENTS

| | | |
|---|---|---|
| 2224283 | 10/1974 | France . |
| 2411079 | 7/1979 | France . |
| 402879 | 9/1924 | Germany . |
| 995044 | 6/1965 | United Kingdom . |

OTHER PUBLICATIONS

Patent Abstracts of Japan, vol. 4, No. 94, (M–19)(576) 8 Jul. 1980 & JP–A–55 053 543 (Matsushita).
"Chaos, Symmetry, and Self–Similarity: Exploiting Order and Disorder in Mixing Processes", by Ottino et al., Science, vol. 257 (Aug. 7, 1992).
"The ET Screw", Robert Barr Inc., PO Box 4476, Virginia Beach, VA 23454.

Primary Examiner—Patrick Brinson
Attorney, Agent, or Firm—Paul R. Webb, II

[57] ABSTRACT

This invention relates to extruders of the type which employ single screws that use chaotic mixing to generate substantially better distributive mixing. Such structures of this type, generally, stretch and fold material lines repeatedly such that interfacial areas between material elements increase exponentially and heat/mass transfers are greatly enhanced.

2 Claims, 9 Drawing Sheets

UC (MADDOCK) MIXING SECTION-1967

EGAN MIXING SECTION

BLISTER RING

PIN MIXING SECTION

DULMAGE MIXING SECTION

SAXON MIXING SECTION

PINEAPPLE MIXING SECTION

SLOTTED SCREW FLIGHT

CAVITY TRANSFER MIXING SECTION

SINGLE SCREW EXTRUDER CAPABLE OF GENERATING CHAOTIC MIXING

This application is a continuation of application Ser. No. 08/121,473 filed Sep. 16, 1993 now abandoned.

BACKGROUND OF THE INVENTION

1. Field of the Invention

This invention relates to extruders of the type which employ single screws that use chaotic mixing to generate substantially better distributive mixing. Such structures of this type, generally, stretch and fold material lines repeatedly such that interfacial areas between material elements increase exponentially and heat/mass transfers are greatly enhanced.

2. Description of the Related Art

Single screw extruders are widely used in the plastics industry as mixers and pumps. The simplest design consists of a screw which rotates inside a dose fitting cylindrical barrel. The screw, typically, includes a feed section, a transition section, and a metering section. Virtually all studies of single screw extruders are based on the unwound representation of the screw channel. The relative motion of the screw and the barrel appears as a plate which moves diagonally on top of the channel (see FIG. 1) in the direction of arrow V.

The fluid flow in the channel can be decomposed into two components, namely, a cross flow in the $x_1$-$x_2$ plane and an axial flow in the $x_3$-direction. The axial flow pumps the materials forward and the cross flow mixes them. However, the mixing in such a conventional screw is poor.

Figure 2:
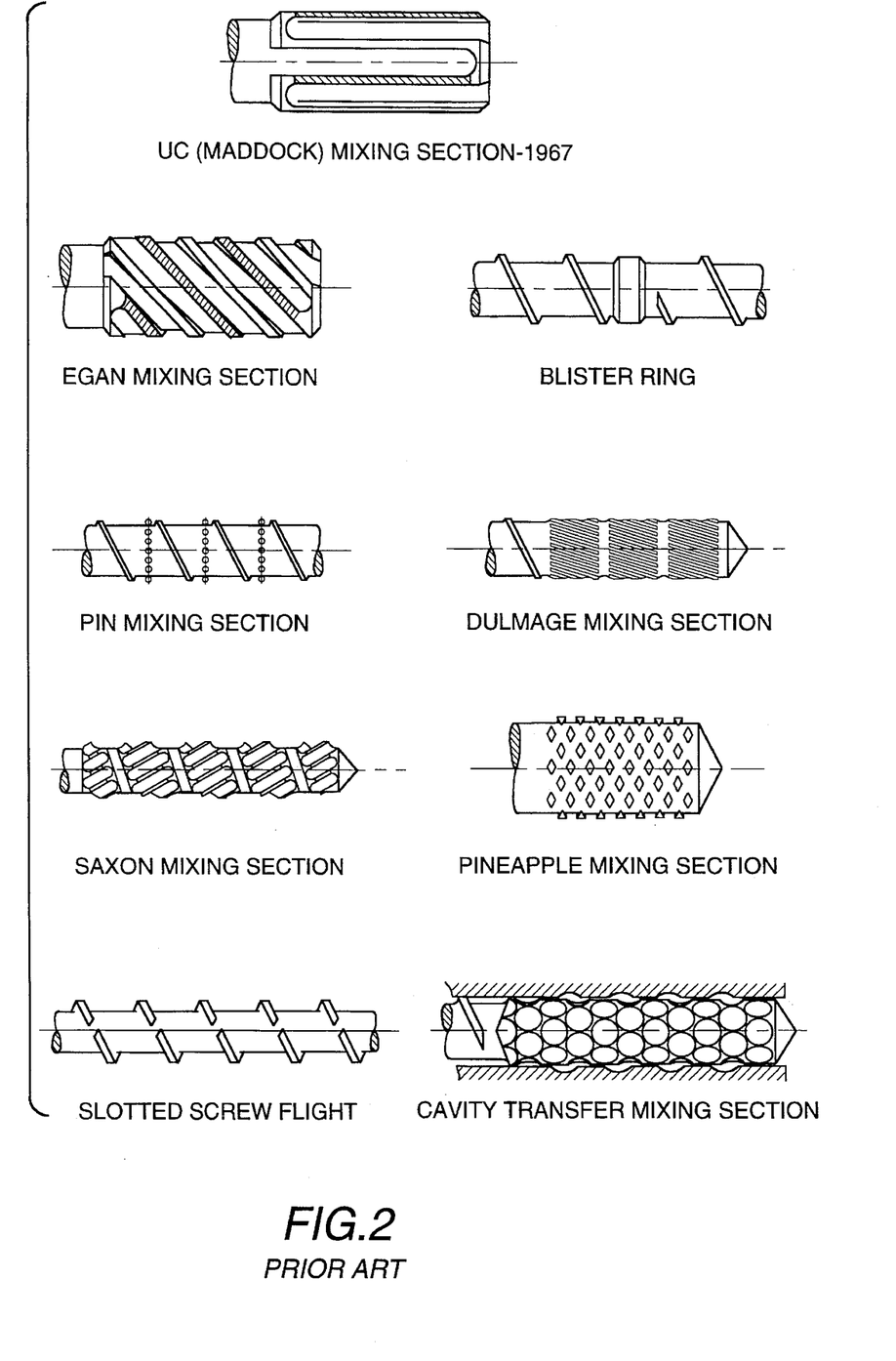
FIG. 2 illustrates the mixing elements for various conventional single screws, according to the prior art.
Figure 3A:
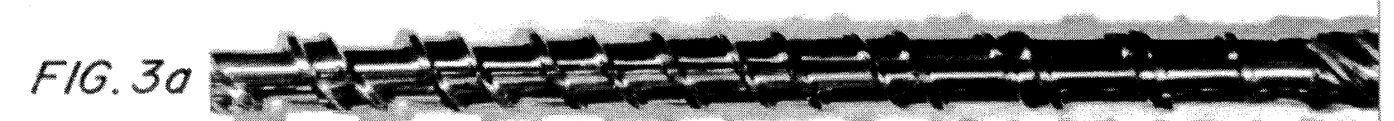
Figure 3B:
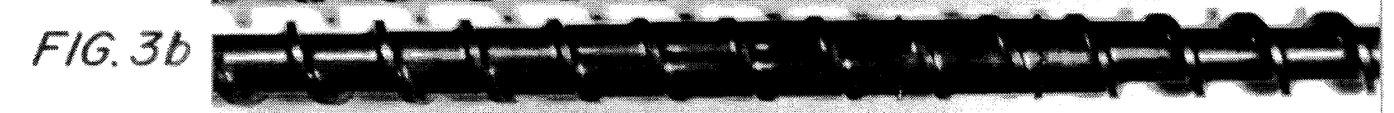
FIG. 3b illustrating a Barr screw.

With respect to FIG. 2, typically, a mixing section such as a Maddock mixing section, a pin mixing section (see also FIG. 3d), a pineapple mixing section, a blister ring, and so on, is added to the screw to increase its dispersive and/or distributive mixing capability. However, these mixing sections are relatively short compared to the length of the screw. It is to be understood that the arrows in FIG. 3 indicate the location of the channel in unit diameter from the shank.

The screw section responsible for mixing is typically characterized by its closeness to the outer barrel to generate the high shear stress required for a dispersive mixing (e.g., Maddock section and blister ring), or by a large number of small units affixed on the root of the screw for a distributive mixing (e.g. pin and pineapple mixing sections).

A different kind of mixing screw, such as barrier screws (see FIGS. 3a and 3b) is designed based on the solid-melt distribution as it is conveyed down the metering section. The barrier screw has two channels, used to separate melt from solid, of varying width separated by an undercut barrier flight. The width of the channel is proportional to the amount of solid or melt. Initially, as pellets start to melt, the melt pool is pushed into the narrow melt channel. The melt channel grows larger as more melt is collected. The Barr ET screws (namely, a Barr ET Barrier screw (manufactured by Robert Barr Incorporated of Virginia Beach, Va.) is claimed to have 30 to 50% better melting rate through mixing of pellets with fresh melt.

Figures 3B, 3C:
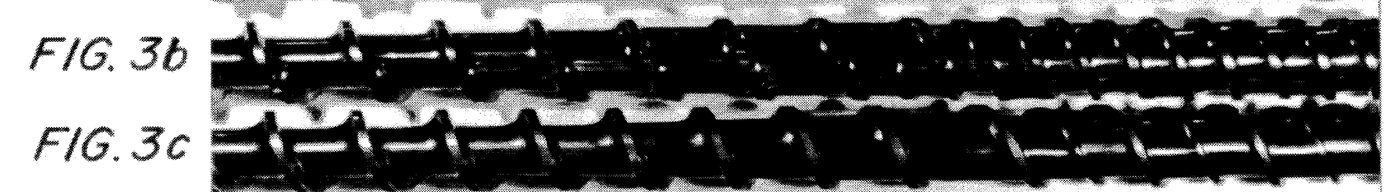
FIG. 3c illustrating a double wave screw.
Figure 3E:
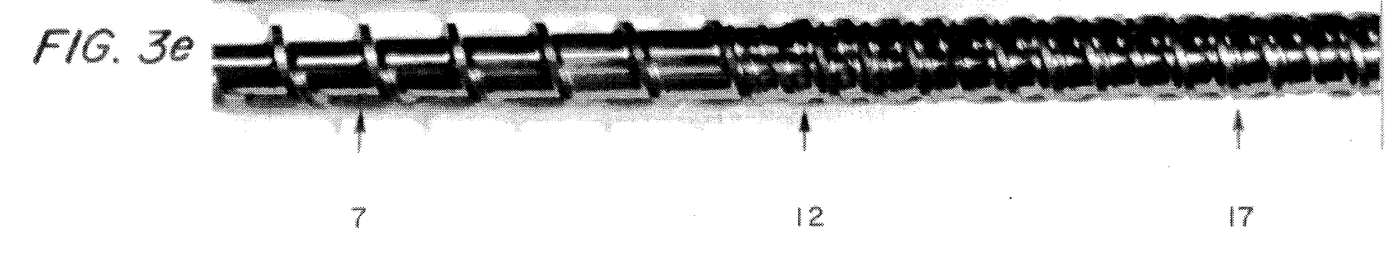
FIG. 3e illustrating a chaos screw, according to the present invention.

Double wave screws are also used. A conventional double wave screw (as shown in FIG. 3c) such as that produced by the HPM Corporation of Mount Gilead, Ohio has two equal width channels separated by an undercut barrier flight. The roots of each channel go up and down like a wave. The channel depth on one is shallow while the channel across is deep. This continually reverses and forces melted polymer back and forth across the barrier. The material in the channel is alternately subjected to high then low shear. Usually these double wave mixing sections are located in the metering section where the plastic has already been melted and run along about 3 to 4 waves. Again, while these double wave screws have increased the mixing, it would still be desirable to increase the mixing even further.

Recent work indicate that time-periodic change of geometry in a 3-dimensional continuous flow can produce chaos in mixing. The spatial-perodicity is aimed to perturb the existing streamline, to induce sustained material re-orientation, and thus, folding. Time integration of the stretching rate of a material line subjected to such periodic re-orientation results in a positive number, also known as a Lyapunov exponent (besides stretching and folding, positive Lyapunov exponent is another signature of chaos).

Also, a two-dimensional Hamiltonian system with periodic time forcing can produce chaos. For example, a cavity (like a deep aquarium tank) filled with a viscous fluid with any one of its walls in motion (for example, the top wall moving left to right) is a 2-dimensional Hamiltonian system. If one wall (for example, the top wall) is put in motion for a duration of time ($t_1$) and then stopped, then another wall (for example, the bottom wall) is put in motion for a duration of time ($t_2$) and then stopped, then chaos is possible.

Finally, periodic geometric change, instead of periodic time forcing can also produce chaos. As with the cavity example above, if the top wall is moved and the geometry of the rest of the cavity is changed, this will produce chaotic mixing. An example of changing the geometry would be to use baffle inserts. It should be noted however, that neither the periodic time forcing or the periodic geometric change of more than 5 continuous periods or repeat units has been applied to existing screw configurations. Therefore, a more advantageous screw would then be presented if such chaotic mixing could be applied to existing screws.

It is apparent from the above there exists a need in the art for an extruder which is capable of distributive mixing, and which at least equals the mixing characteristics of known screws, but which at the same time is also capable of excellent heat/mass transfer through the use of chaotic mixing. It is a purpose of this invention to fulfil this and other needs in the art in a manner more apparent to the skilled artisan once given the following disclosure.

SUMMARY OF THE INVENTION

Generally speaking, this invention fulfills these needs by providing a single screw extruder for generating chaotic mixing, comprising single screw means having a feed section, a transition section and a metering section, a baffle means operatively attached to said screw means such that said baffle means are constructed of a predetermined length ($L_B$) and height ($H_B$) and are positioned on said screw means in a predetermined periodic orientation, and a cylindrical enclosure means which substantially surrounds said screw means and said baffle means.

In certain preferred embodiments, the aspect ratio of the cavity (width (W)/height (H)) is about 4 to 5. Also, the predetermined periodic orientation is a center-right-center-left baffle sequence.

In another further preferred embodiment, the single screw extruder is able to generate substantially better distributive mixing and is capable of stretching and folder material lines repeatedly such that interfacial areas between fluid elements increases exponentially and heat/mass transfers are greatly enhanced.

The preferred single screw extruder, according to this invention, offers the following advantages: excellent mixing characteristics; excellent heat/mass transfers; excellent melting characteristics; excellent stretching and folding characteristics; excellent flow characteristics; good economy; and high strength for safety. In fact, in many of the preferred embodiments, these factors of mixing, heat/mass transfers, melting, stretching, folding, and flow characteristics are optimized to an extent that is considerably higher than heretofore achieved in prior, known single screw extruders.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several views and in which:

FIGS. 3a–3e illustrate two-stage 32 L/D single screws with FIG. 3a illustrating a Barrier screw with a dispersive mixing section; FIG. 3d illustrating a pin screw.

FIGS. 9a–9e are taken from extrudate shown in FIG. 8a. FIGS. 9f–9j are taken from FIG. 8b. FIGS. 9k–9o are taken from FIG. 8c.

DETAILED DESCRIPTION OF THE INVENTION

As discussed earlier, FIG. 1 illustrates the relative motion of the screw and the barrel according to the prior art. FIG. 2 illustrates various mixing sections in single screw extruders.

Figure 1:
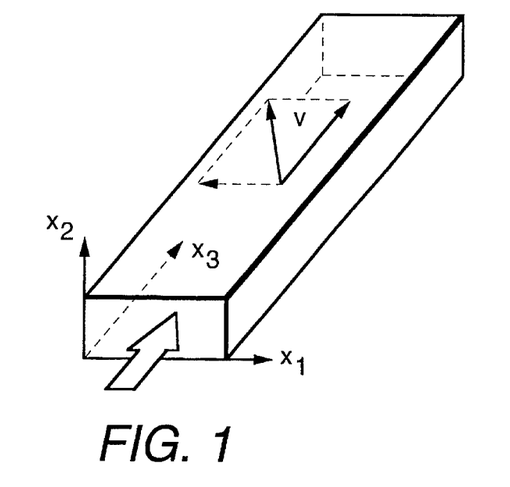
FIG. 1 is a schematic illustration of a rectangular channel model of a single screw extruder, according to the prior art.
Figure 4A:
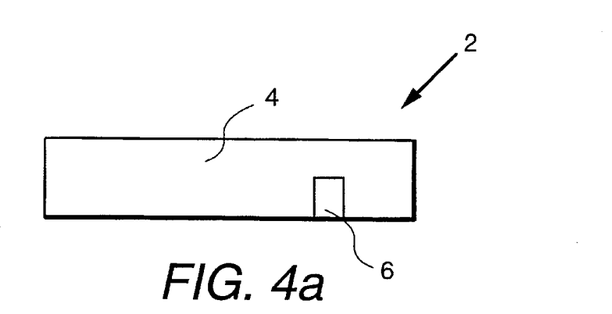
FIGS. 4a–4c are schematic illustrations of three different baffle positions for a single screw extruder capable of generating chaotic mixing, according to the present invention.

As shown in FIGS. 4a,b and c there is illustrated $x_1$–$x_2$ cross-section of single screw extruder 2 (see also FIG. 1). It is to be understood that extruder 2 includes a feed section, a transition section, and a metering section. The cross-section 2 includes in part, channel cavity 4 and baffles 6. The spatial-periodicity is generated using baffles 6 which are constructed of a discrete length and which are periodically positioned on the channel 4. FIGS. 4a,b and c also illustrate the height (H) and width (W) of the channel cavity and the baffle height ($H_B$).

Figure 4B:
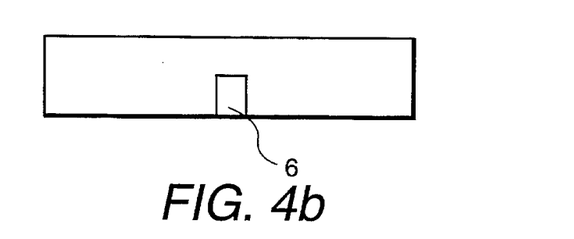
Figure 4C:
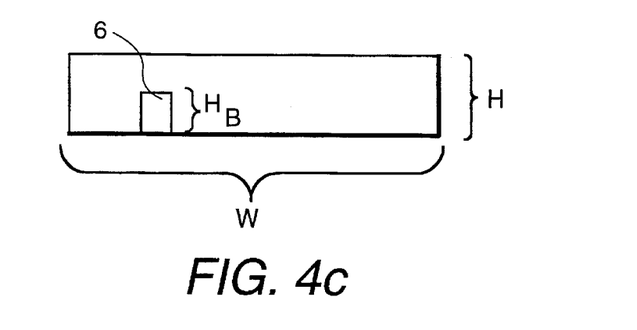
Figure 5A:
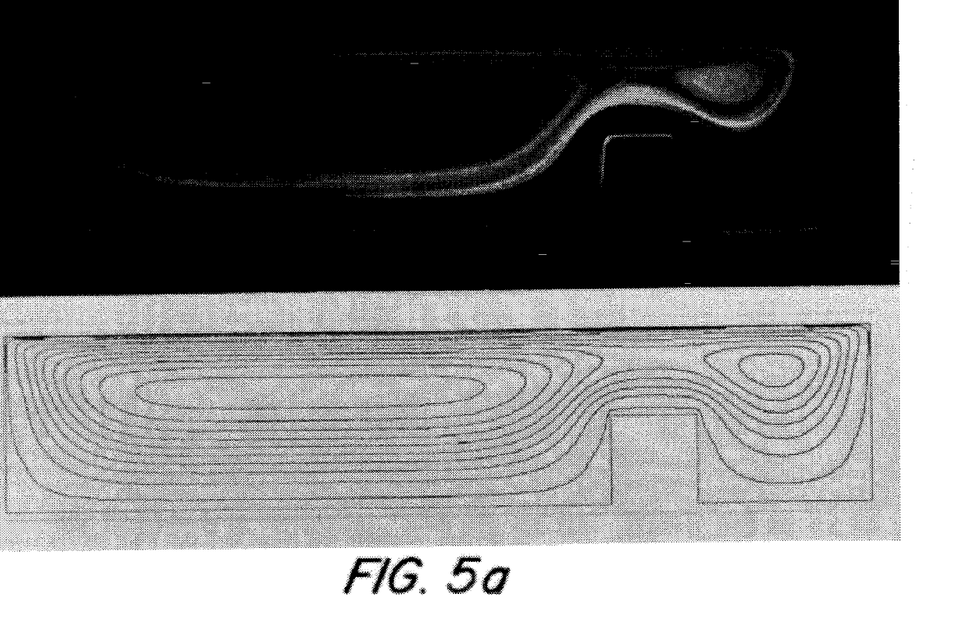
FIGS. 5a and 5b illustrate geometrical streamline contours in the baffle-added channels of FIGS. 4a and 4b, according the present invention.
Figure 5B:
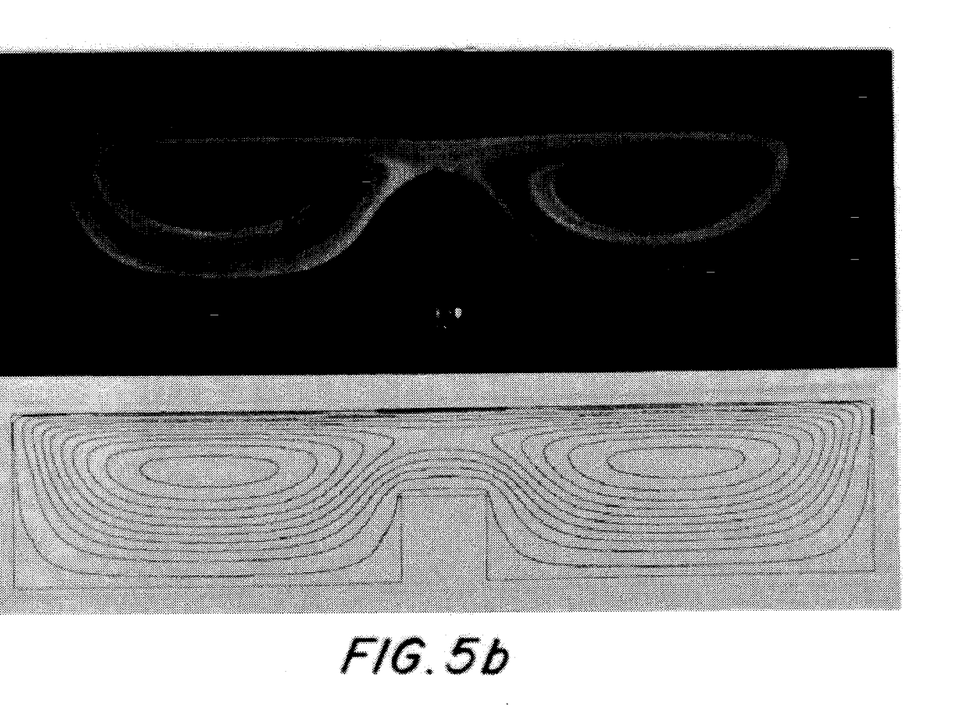
Figure 6A:
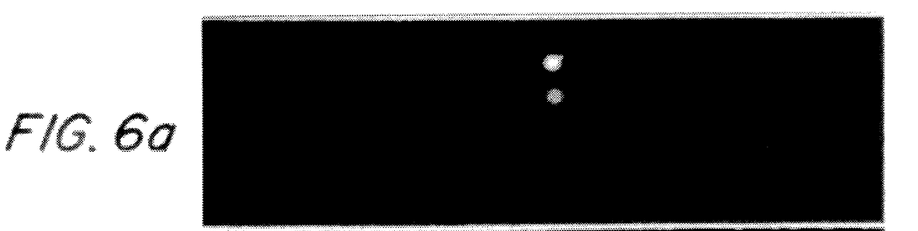
FIGS. 6a–6j illustrate dye deformation patterns involved in a conventional unobstructed cavity (FIGS. 6a–6e) and in a cavity according to the present invention with periodic, center-right-center-left, baffle sequence (FIGS. 6f–6j)
Figure 6B:
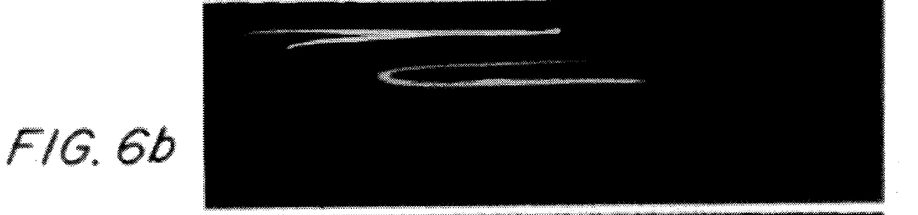
Figure 6C:
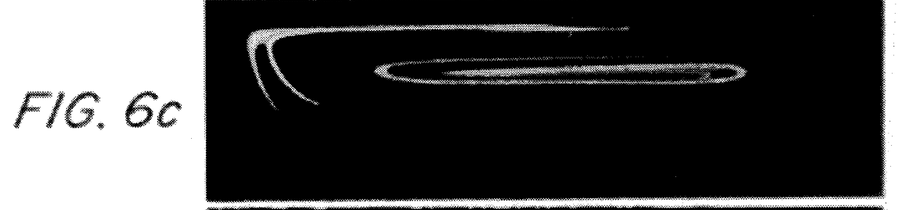
Figure 6D:
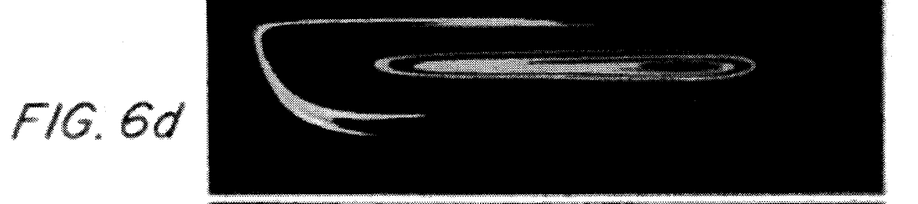
Figure 6E:
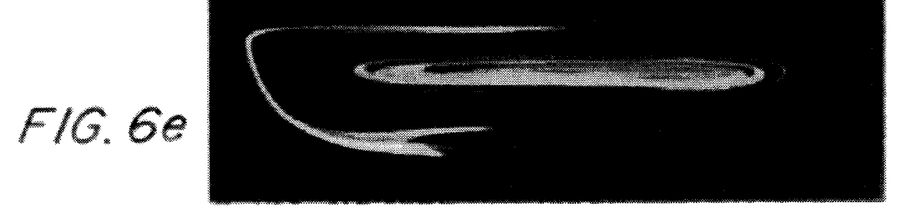
Figure 6F:
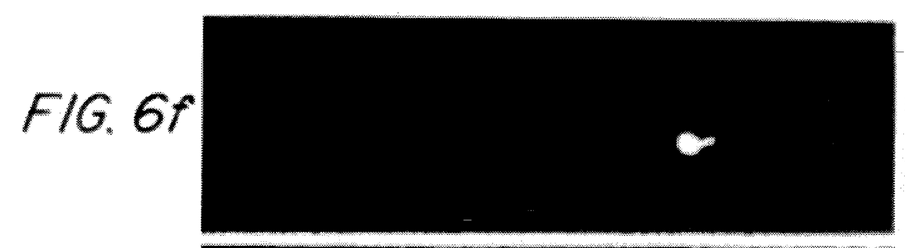
Figure 6G:
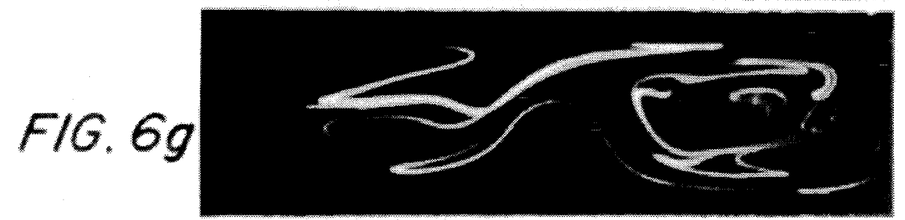
Figure 6H:
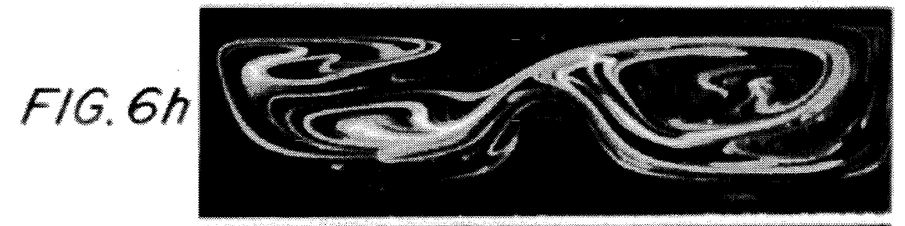
Figure 6I:
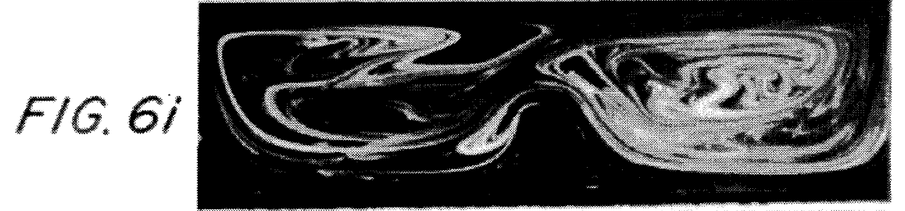
Figure 6J:
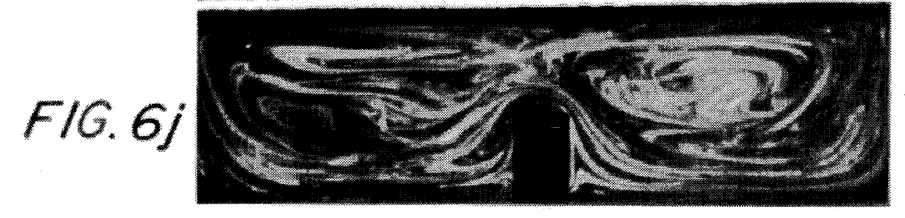

FIGS. 5a and 5b show steady flow (streamlines) experiments in fine element simulations corresponding to the first two baffle positions (namely FIGS. 4a and 4b, respectively). The third position is simply the mirror image of the first position.

Experimental investigation of two-dimensional cavity flow with periodic insertion-removal of a rectangular block from a bottom wall at different locations is conducted to search for the optimum baffle configuration to generate chaotic flows. The in and out motions of these blocks at different positions produces a time-dependent change in the geometry of the cavity. The outcome of this investigation, which is used as the basis for the design of a spatially-periodic screw, is as follows:

1. Chaotic mixing is best produced with a center-right-center-left baffle 6 sequence. This sequence constitutes a period.

2. Chaotic mixing is best produced when the aspect ratio of the cavity (W/H) is about 4 to 5. This restriction causes the streamlines from two different geometries to cross at an angle large enough to produce significant material re-orientation.

3. The baffle should stay in the same position until the top wall has moved the length equivalent to the width of the cavity (W) (FIG. 4). Such a time restriction allows a fold to develop and stretching to occur, and at the same time would allow materials to transfer from one side of the cavity to the other side.

4. The left or right baffle must not be too close to the flight such that the hyperbolic point between the baffle and the (moving) upper wall is destroyed (a hyperbolic point is a saddle point between the baffle and the top wall in the steady flow experiment shown in FIGS. 5a and 5b). On the other hand, the left or right baffle must be far away from the center to produce significant streamline crossing. The left and right baffles are located about one-quarter of the width of the cavity from the left and right walls, respectively.

5. The height ($H_B$) of the baffle 6 should be at least 0.50 the channel height (H).

It is to be understood that the optimization of the baffle configuration strongly depends on the components to mixed, the rheology of the fluids, screw speed, and many other processing parameters. However, the improvement in mixing due to sustained material reorientation versus no reorientation is undoubtful.

FIGS. 6a–6j show the comparison between mixing in an unobstructed cavity (FIGS. 6a–6e) and a cavity with periodic, center-right-center-left, baffle sequence (FIGS. 6f–6j). In both experiments, the top wall has moved 0, 5, 9, 13, 17 W from the top to the bottom pictures, respectively. Despite the same energy consumption (i.e., wall displacement), the mixing shown in FIGS. 6f–6j is much better.

Figure 7A:
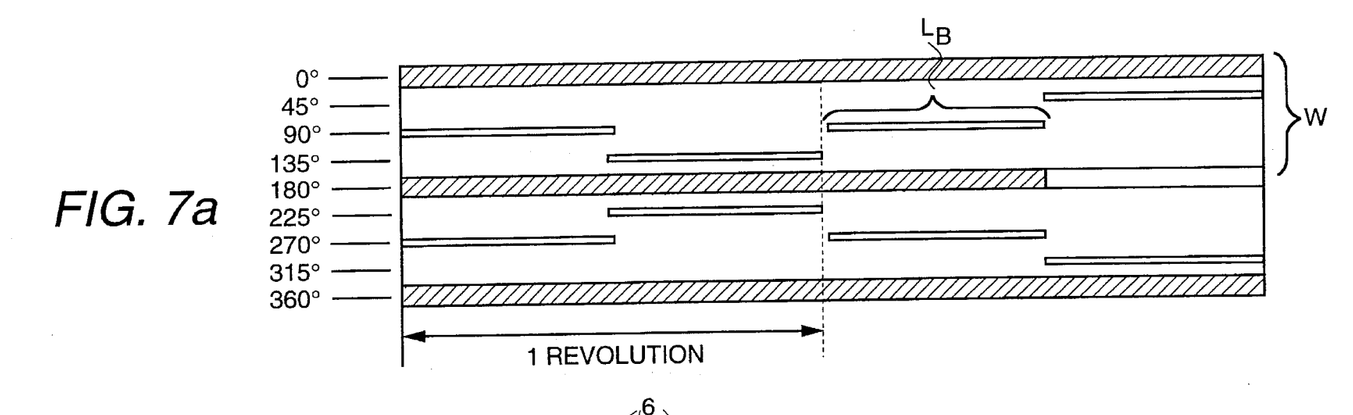
FIG. 7a illustrates one period of a center-right-center-left baffle sequence in a double flighted channel section, according to the present invention.

With respect to FIG. 7a, the spatially periodic section is located in the screw section where plastic is melting and has melted. Since the cavity aspect ratio of about 5 is preferred, the section is made double flighted (one flight is designated primary and the other secondary) and has a square pitch. There is one baffle located between the primary flight and the secondary flight. Thus, between the primary flights, there are two baffles located at 45° and 315°, or 90° and 270°, or 135° and 225°, off phase from the trailing primary flight.

Figure 7B:
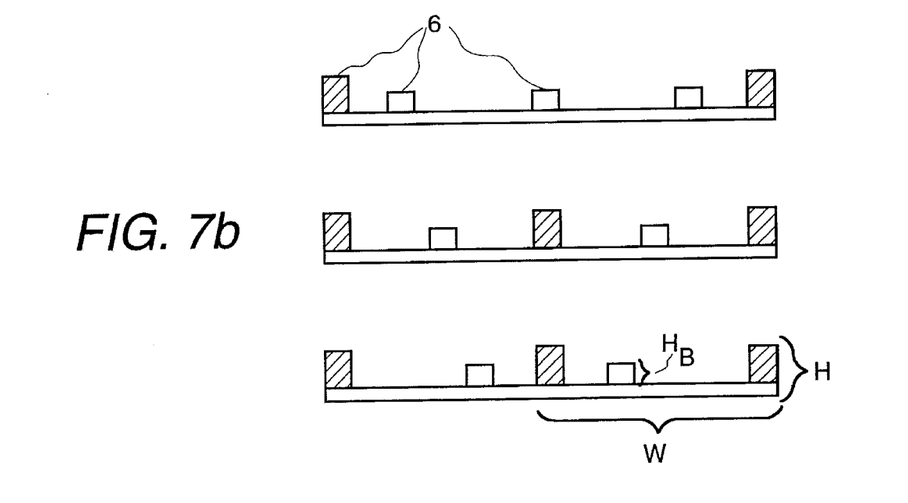
FIG. 7b illustrates cross sections of a baffle-added channels.

The height of the baffle is half the height of the primary flight as shown in FIG. 7b. The secondary flight, which is 180° off phase from the primary flight, is undercut when the baffles are at 45° and 315° to allow for mass transfer between channels. The double flighted section also reduces the length of each baffle to half a revolution of the screw and, therefore, increases the number of period.

Figure 8A:
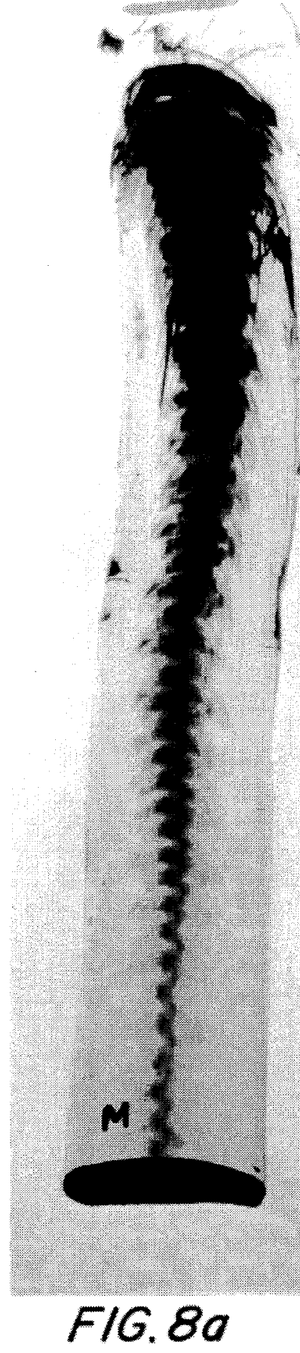
FIGS. 8a–8c illustrate typical extrudates from a conventional metering screw (FIG. 8a), a Barr screw (FIG. 8b), and a chaotic screw according to the present invention (FIG. 8c)
Figure 8B:
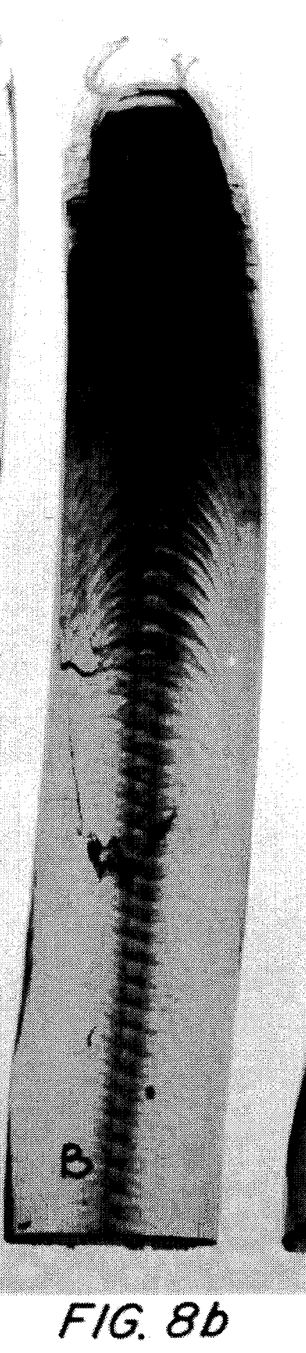
Figure 8C:
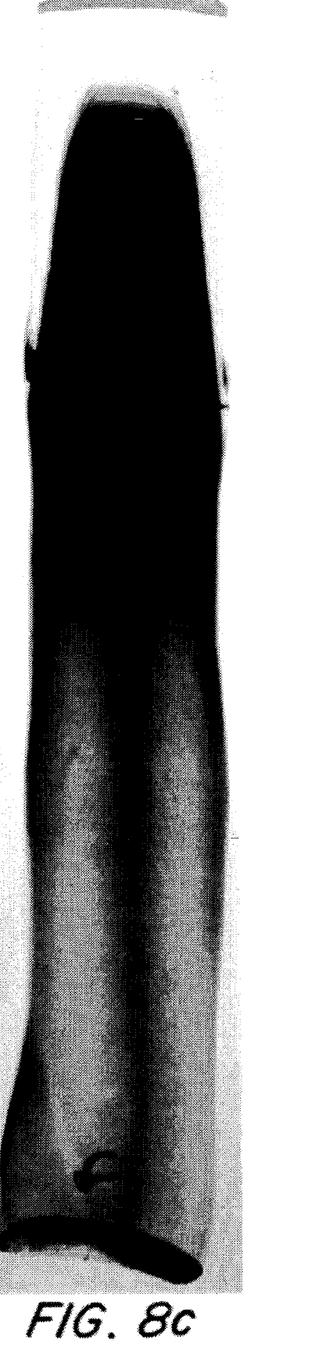

As shown in FIGS. 8a–8c, the performance of the chaotic screw (FIG. 8c), according to the present invention, is compared with a conventional metering screw (FIG. 8a) and a Barr screw (FIG. 8b). The die attachment at the end of the screw is removed. The bulk material used is transparent polystyrene. Polycarbonate pellets, which have been pre-concentrated with carbon black, are dropped into a feed hopper (almost empty) at 2 minute intervals so that the effects of mixing of a single black pellet in the extrudate can be isolated for flow visualization studies. The 2.5" diameter screw of this particular experiment is moving at 50 rpm and the flowrate is about 110 lbs/hr. As clearly shown in FIGS. 8a–8c, better mixing is achieved using the chaotic screw of the present invention (FIG. 8c).

Figure 9A:
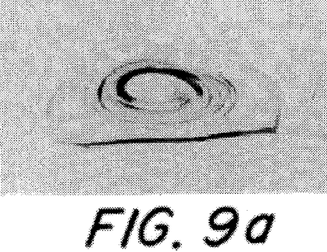
FIGS. 9a–9o illustrate cross sections of extrudates sliced at intervals along FIGS. 8a–8c.
Figure 9B:
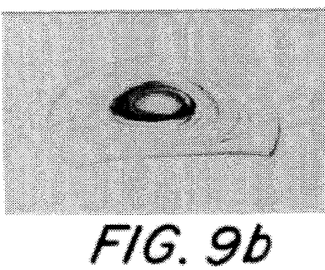
Figure 9C:
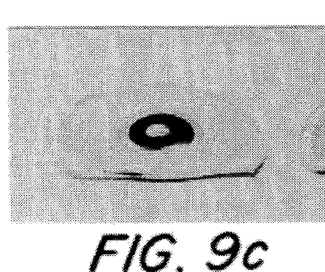
Figure 9D:
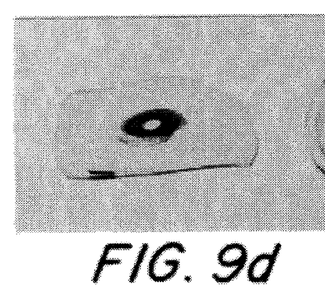
Figure 9E:
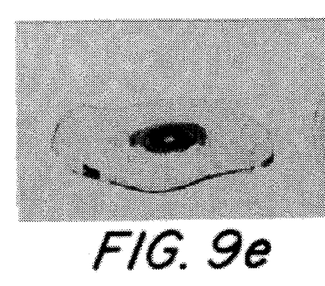
Figure 9F:
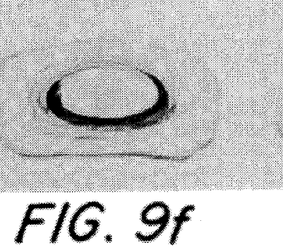
Figure 9G:
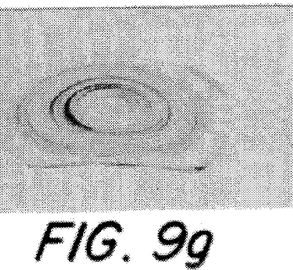
Figure 9H:
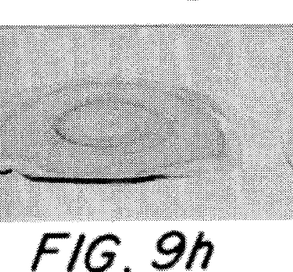
Figure 9I:
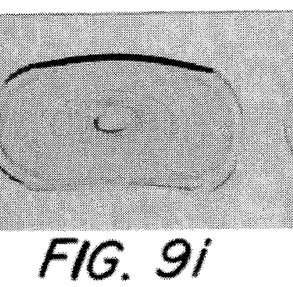
Figure 9J:
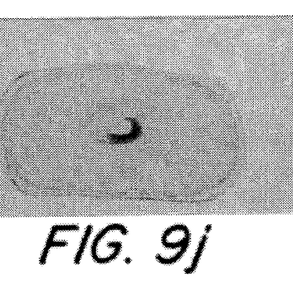
Figure 9K:
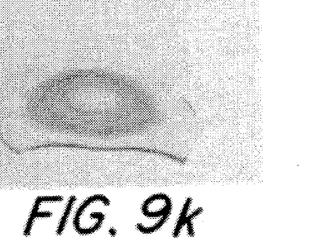
Figure 9L:
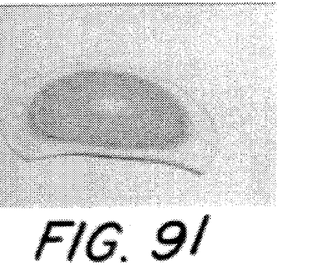
Figure 9M:
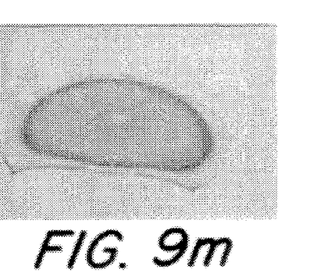
Figure 9N:
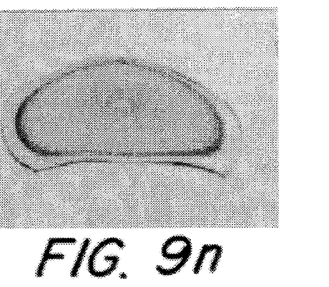
Figure 9O:
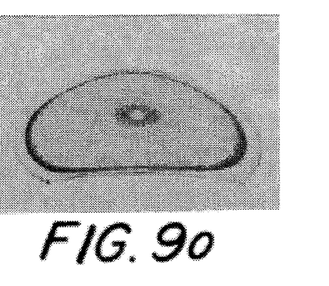

FIGS. 9a–9o show cross-sections (about ⅛ inch thick) from each extrudate shown in FIG. 8a–8c, respectively, sliced at about 1.0, 2.5, 4.0, 5.5, 7.0 inches, respectively, from the top margin where carbon tracers are first encountered. In all three extrudates, carbon tracers initially came out rather concentrated (for the first few inches) and their concentration/intensity rapidly decays. The tracers produced in the metering screw (FIGS. 9a–9e) display some thick helical pattern winding along the extrudate. Mixing is improved a little in the Bart screw (FIGS. 9f–9j), however, most of the tracers are still confined within some thick striations as they exit from the extruder. Mixing is dramatically improved in the chaotic screw according to the present invention (FIGS. 9k–9o). The chaotic flow is able to stretch and fold the tracer domain into very thin and fine striations. There are regions not penetrated by the tracers near the edge of the extrudate due to the transient nature of the experiment. These regions are filled when the bulk material is premixed with black pellets and the flow is steady.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A single screw extruder for generating chaotic mixing comprising:

a screw having a continuous flight thereon which defines a channel having a width and a height;

a plurality of baffles disposed in said channel; and said channel having an aspect ratio of said width to height between 4 and 6.

2. A single screw extruder for generating chaotic mixing comprising:

a screw having a continuous primary flight and a continuous secondary flight thereon which define a pair of channels each having a width and a height;

a plurality of baffles disposed in each channel; and each channel has an aspect ratio of said width-to-height between 4 and 6.

* * * * *